July 17, 1951        E. J. DYKSMA        2,561,268
RETRACTABLE WHEEL ATTACHMENT FOR BICYCLES
Filed Feb. 1, 1946        3 Sheets-Sheet 1
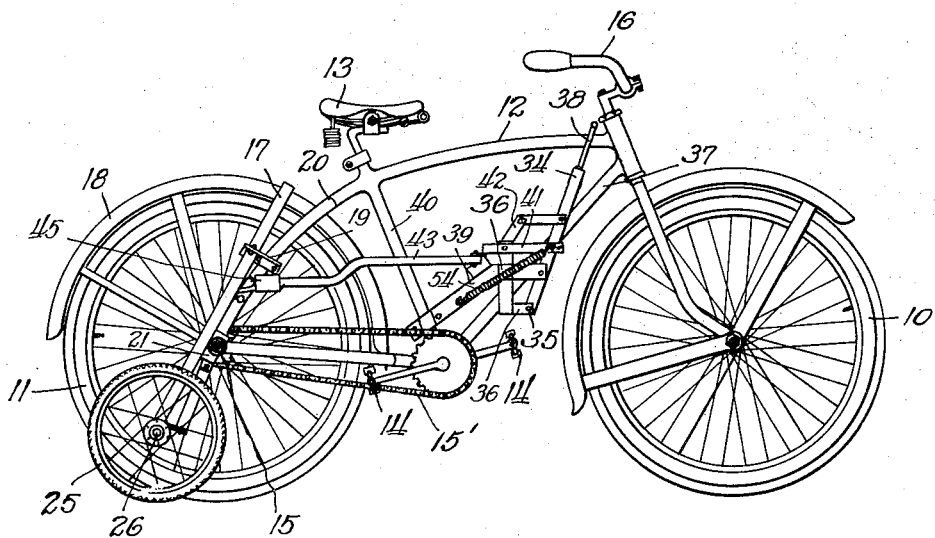
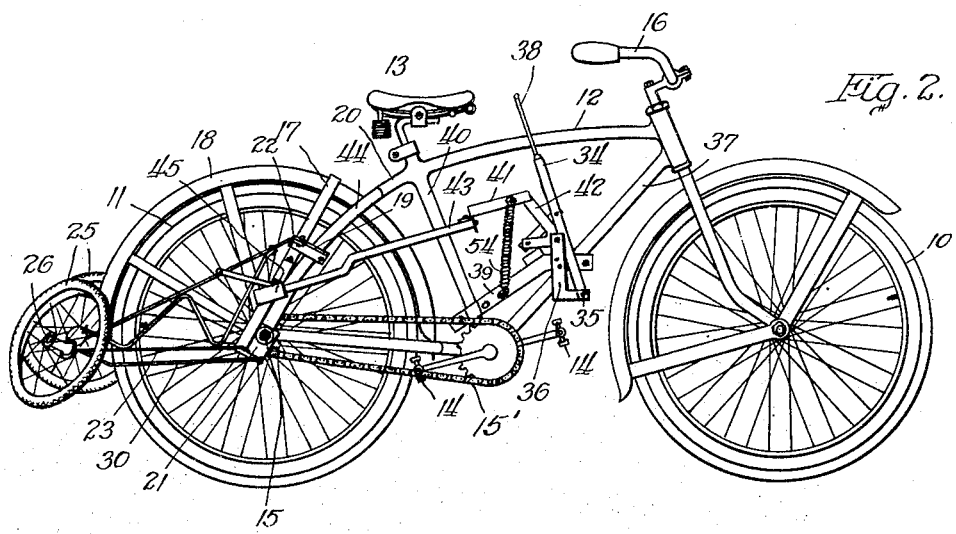
Inventor:
Edward J. Dyksma.

July 17, 1951        E. J. DYKSMA        2,561,268
RETRACTABLE WHEEL ATTACHMENT FOR BICYCLES
Filed Feb. 1, 1946        3 Sheets-Sheet 2
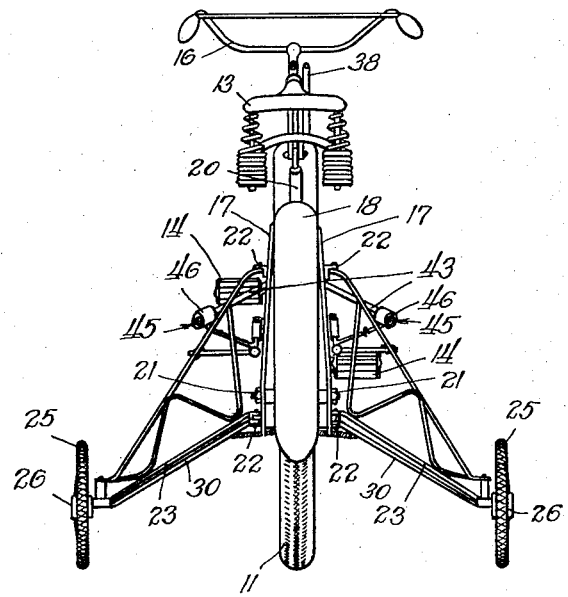
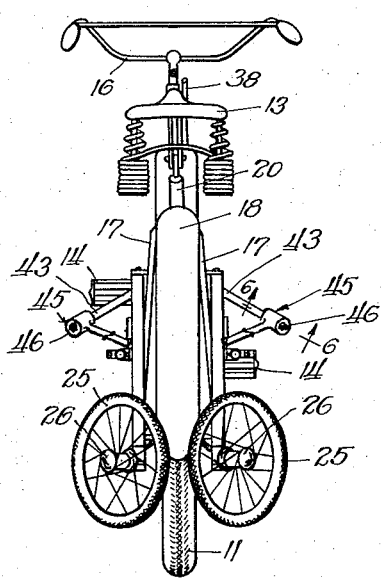
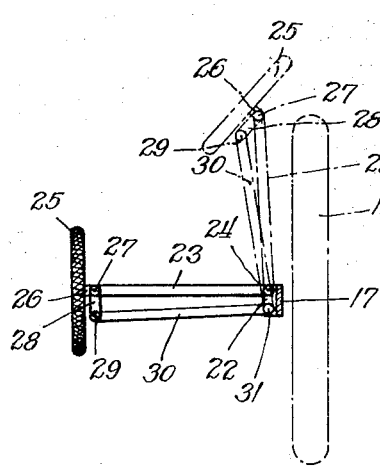
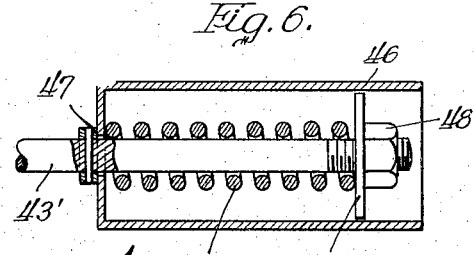
Inventor:
Edward J. Dyksma
By Brown, Jackson, Boettcher & Dienner
Attys.

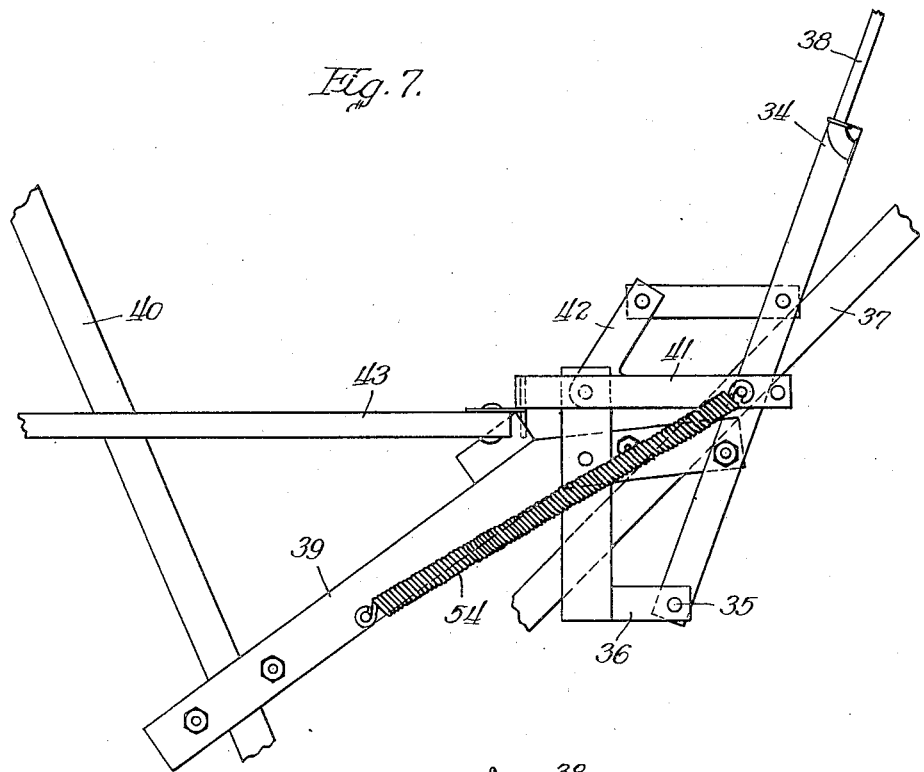
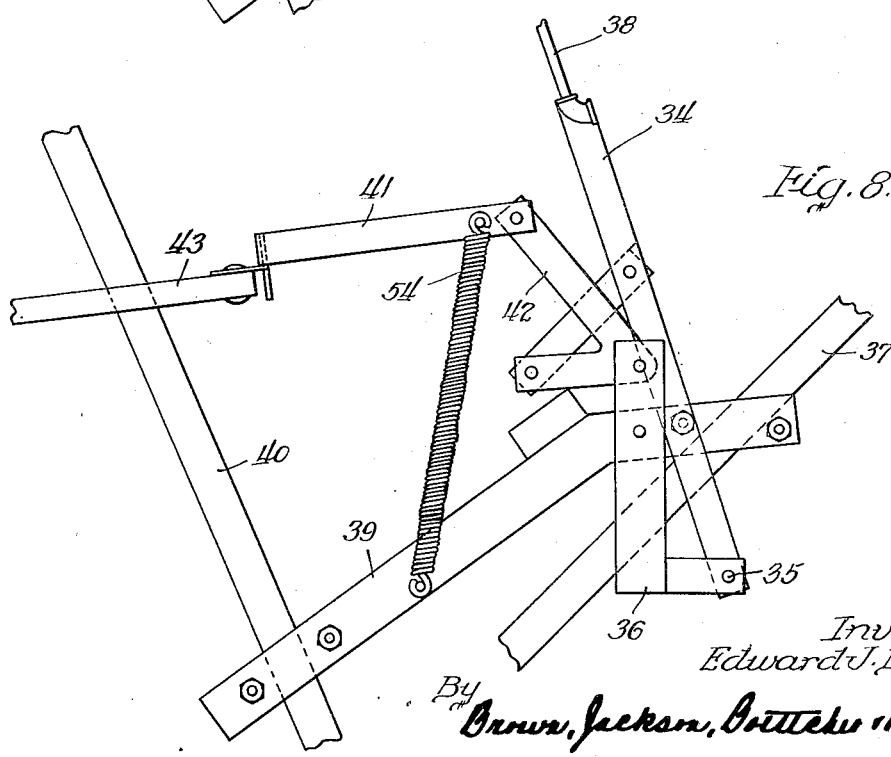

Patented July 17, 1951

2,561,268

UNITED STATES PATENT OFFICE 2,561,268

RETRACTABLE WHEEL ATTACHMENT FOR BICYCLES

Edward J. Dyksma, Harvey, Ill.

Application February 1, 1946, Serial No. 644,892

4 Claims. (Cl. 280—293)

This invention relates, in general, to bicycles, and has particular relation to an improved retractable wheel attachment for bicycles and the like.

While the particular device which I shall describe hereinafter in connection with the drawings is an attachment operable to position to steady a standard bicycle in starting and stopping so as to enable disabled or lame persons lacking the natural use of a limb or limbs to mount and dismount without starting and stopping in position adjacent an object that may be grasped to steady the bicycle and hold it upright, it is to be understood that the invention is not limited to such use but may be employed by beginners learning to ride, and elsewhere as suitable and desired.

Retractable wheel attachments have been previously proposed, but they have not brought the retractable wheels into as compact relation as desired when not in use. The retractable wheels of such prior attachments have projected laterally undue amounts when in retracted position. In addition, the mounting brackets for the retractable wheels have heretofore projected unduly from the sides of the bicycle. These brackets, with their undue lateral projection and the projection of the retractable wheels unduly from the sides of the bicycle when not in use, have decreased the clearance of the bicycle and presented loads affecting the balance of the bicycle.

Moreover, the prior attachments have involved difficulties in operation, and the retractable wheels have not been tensioned properly when in their extended or operating position; nor have the prior attachments had tension means which could be conveniently adjusted to maintain the desired tensioning of the retractable wheels in their extended or operating position.

One of the main objects of the present invention is to provide an improved retractable wheel attachment which will enable disabled or lame persons lacking the natural use of a limb or limbs, or others, readily to mount and dismount the bicycle and which is operable to retracted position with the retractable wheels out of engagement with the ground for riding the bicycle in the usual manner.

Another object of the invention is to provide an improved form of retractable wheel attachment adapted to be very quickly and easily applied to a standard bicycle and which, when applied to the bicycle, may be conveniently operated to retracted and extended positions by the rider.

Another object of the invention is to provide a retractable wheel attachment in which the retractable wheels are more compactly disposed when in retracted position than in previously proposed attachments, thus affording increased clearance in the normal use of the bicycle.

Another object of the invention is to provide an attachment in which lateral projection of mounting brackets and other parts of the attachment, as well as lateral projection of the retractable wheels, is reduced to a minimum.

Another object of the invention is to provide an improved form of mounting for mounting the attachment on the bicycle.

Another object of the invention is to provide improved means for operating the retractable wheels to extended and retracted positions, and an improved mounting for the wheels and the operating means.

Another object of the invention is to provide improved tension means for tensioning the retractable wheels; more particularly adjustable tensioning means adapted to be conveniently adjusted to maintain the desired tensioning of the retractable wheels in their extended or operating position.

Further objects and advantages of the invention will appear from the following detailed description, taken in connection with the accompanying drawings which illustrate the manner of constructing and operating one form of device embodying the present invention.

In the drawings:

Figure 1 is a side elevational view of a bicycle having the retractable wheel attachment of the present invention applied thereto, with the retractable wheels in extended or operating position;

Figure 2 is a side view similar to Figure 1, with the retractable wheels in retracted position;

Figure 3 is a rear view of the bicycle and attachment, with the retractable wheels in extended or operating position;

Figure 4 is a view similar to Figure 3, with the retractable wheels in retracted position;

Figure 5 is a more or less diagrammatic view showing the rear wheel of the bicycle in dotted lines, with the adjacent retractable wheel shown in full lines in its extended or operating position, and in dotted lines in its retracted position;

Figure 6 is a fragmentary detail section through one of the tension devices, taken on the line 6—6 of Figure 4;

Figure 7 is a fragmentary and more or less diagrammatic view of the means for operating the retractable wheels to their extended and retracted positions, with this means in the position occupied when the retractable wheels are extended for use; and Figure 8 is a view similar to Figure 7 with the retractable wheel operating means in the position occupied when the retractable wheels are retracted.

Referring now to the drawings, I have shown for purposes of illustration a standard bicycle of a type now commercially in use. It comprises front and rear wheels 10 and 11 arranged tandem, united by a frame 12 with a rider's or driver's seat 13 on it. The bicycle selected for illustration is propelled by the driver's feet acting on the pedals 14 connected with one of the axles, for example, the rear axle 15, by means of a chain 15', and steered by a handle-bar 16 which guides the direction of the front wheel 10.

The attachment comprises a main mounting bracket 17 of inverted generally U-shaped form. The bracket 17 straddles the rear wheel 11 and preferably the guard 18 therefor, where such guard is provided, and is fixedly mounted by brackets 19, 19 on the branches of the forked rear brace or member 20 of the frame 12. The depending legs of the bracket 17 also preferably have support at 21, 21 in positions spaced from their lower ends on the opposite ends of the rear axle 15.

The outer side of each depending leg of the bracket 17 carries a pair of fixed vertically spaced lugs 22, 22, to each of which pair of lugs 22, 22 a trussed or braced retractable wheel carrying frame 23 is pivoted at 24, 24 for swinging movement about the vertical axes of the pivots 24, 24 to extended and retracted positions. The retractable wheels 25, 25 are journaled for rotation on axles 26, 26 pivoted at 27, 27 respectively on the outer ends of the frames 23, 23. Each axle 26 has an arm 28 extending at substantially right angles therefrom and pivoted at 29 to a link 30. The inner ends of the links 30, 30 are pivoted at 31, 31 to the lower fixed lugs 22; the links 30, 30 operating, as shown in Figure 5, to swing the axles 26, 26 and retractable wheels 25, 25 about the pivots 27, 27 at the outer ends of the frames 23, 23 upon swinging the frames 23, 23 to extended and retracted positions, as will hereinafter appear.

As shown in Figure 5, the frames 23, 23, links 30, 30, and retractable wheels 25, 25 are arranged so that upon swinging the wheels 25, 25 to retracted position the frames 23, 23 will assume compact parallel relation adjacent the sides of the rear wheel 11, with the retractable wheels 25, 25 in oblique position compactly overlapping and adjacent to the rear of the wheel 11.

The operating means for swinging the retractable wheels 25, 25 to extended and retracted position comprises a lever 34 pivoted at its lower end at 35 to a lever anchor bracket 36, which bracket 36 is clamped or otherwise fixedly mounted or secured to the member 37 of the frame 12. The upper end of the lever 34 has a handle 38 conveniently accessible to the rider's hand from his position on the seat 13. A supplemental anchor or mounting member 39 is clamped or fixedly secured to the members 37 and 40 of the frame 12.

The lever 34 is connected by pivoted links 41 and 42 to a forked control bar 43. The branches of the forked bar 43 straddle the member 40 of the frame 12 and the rear wheel 11, and have tensioned connections 45, 45 with the pivoted retractable wheel carrying frames 23, 23. The tensioned connections 45, 45 comprise, as shown in Figure 6, sleeves 46 fixedly secured to the frames 23; the branches 43' of the forked bar 43 extending into the sleeves 46 and having shoulders 47 abutting the inner ends of the sleeves 46 to push the sleeves 46, and thereby the frames 23, rearwardly about their pivots 24 as the lever 34 is swung rearwardly about its pivot 35 from the position shown in Figure 1 to the position shown in Figure 2.

The outer ends of the branches 43' of the forked bar 43 have nuts 48 screwed thereon, and springs 50 are coiled about the branches 43' and confined between the nuts 48 and the inner ends of the sleeves 46. The outer end of each sleeve 46 is open so that nut 48 may be removed and washers inserted to adjust the tension of the spring 50. One washer is shown at 52 in Figure 6. The adjustment may, of course, be secured in any other desired manner, for example, by adjusting the nuts 48 along the branches 43'. A coiled spring 54 is interposed between the link 41 and member 39.

In operation, when the bicycle is on the road the control or shifting lever 34 is in the position shown in Figure 2 and the frames 23 and retractable wheels 25 are in the positions shown in Figures 2 and 4, and in dotted lines in Figure 5. When the rider desires to dismount, the handle 38 is grasped and the lever 34 swung from the position shown in Figure 2 to the position shown in Figure 1. This swings the frames 23 and retractable wheels 25 to their extended positions, as shown in Figures 1 and 3 and in full lines in Figure 5, with the wheels 25 engaging the ground in spaced positions from the opposite sides of the wheel 11 to steady the bicycle in dismounting.

The lever 34 may be positioned as shown in Figure 1, with the frames 23 and wheels 25 in extended position as shown in Figures 1 and 3 and in full lines in Figure 5 to steady the bicycle in mounting the same. Then, after the bicycle is mounted and on the road, the lever 34 may be conveniently swung from the position shown in Figures 1 and 3, and in full lines in Figure 5, to retracted position shown in Figures 2 and 4 and in dotted lines in Figure 5.

When the retractable wheels 25 are in retracted position, the bicycle is propelled over the road in the usual manner on the wheels 10 and 11. In retracted positions the wheels 25 and mounting and control or shift means therefor are compactly disposed adjacent the sides of the bicycle, thus affording maximum clearance in the normal use of the bicycle. The retractable wheel attachment of the present invention can be quickly and easily applied to a standard bicycle and, when applied, can be conveniently operated to retracted and extended positions by the rider from his position on the seat 13. The tension means tensions the retractable wheels 25 in their extended and retracted positions, and is adapted to be conveniently adjusted to maintain the desired tensioning of the retractable wheels.

The embodiment of the invention shown in the drawings is for illustrative purposes only, and it is to be expressly understood that the drawings and the accompanying specification are not to be construed as a definition of the limits or scope of the invention, reference being had to the appended claims for that purpose.

I claim:

1. In a retractable wheel attachment for a bicycle having a frame provided with a seat, front and rear wheels and a handle-bar, in combination, a mounting bracket adapted for attachment to the bicycle and straddling the rear wheel, a pair of retractable wheel carrying frames, one pivoted at its inner end to each side of said bracket, operating means for swinging said frames outwardly in opposite directions to laterally extended positions and inwardly in opposite directions to inwardly retracted positions, axles pivoted on the outer ends of said wheel frames, wheels journaled for rotation on said axles, arms extending at substantially right angles from said axles in position adjacent said wheels, links disposed in generally parallel spaced relation to the planes of said wheel frames when said frames are in extended positions, the outer ends of said links being pivoted to the arms extending from said axles and the inner ends of said links being pivoted to said mounting bracket, with the pivots at the outer and inner ends of said links spaced generally forwardly of the wheel frames when said frames are extended, whereby upon swinging movement of the wheel frames to retracted positions said links operate to position said retractable wheels in oblique positions overlapping the rear wheel of the bicycle, said operating means comprising a lever pivoted to the bicycle frame and accessible to a rider from position on the bicycle seat, a forked member connected to the retractable wheel frames, and pivoted link means connected between said forked member and said lever, whereby upon swinging movement of said lever said retractable wheel frames are swung to retracted and to laterally extended positions, the wheels on the wheel frames being on the ground simultaneously with the bicycle wheels when said wheel frames are in laterally extended positions, said operating means being disposed entirely outside the space between the wheel frames and entirely outside the space between said links whereby to permit disposition of the rear wheel of the bicycle in said space.

2. A retractable wheel attachment according to claim 1 wherein the pivots between the inner ends of said links and said mounting bracket are spaced vertically from the pivots between the inner ends of said wheel frames and said mounting bracket.

3. A retractable wheel attachment according to claim 1 wherein the wheel frames are of trussed form and wherein the pivots between the inner ends of said links and said mounting bracket are spaced vertically beneath the pivots between the inner ends of said wheel frames and said mounting bracket.

4. A retractable wheel attachment according to claim 1 wherein the operating means for swinging the retractable wheel carrying frames has yielding connection with said frames.

EDWARD J. DYKSMA.

REFERENCES CITED

The following references are of record in the file of this patent:

UNITED STATES PATENTS

| Number | Name | Date |
|---|---|---|
| 1,177,290 | Tollstam | Mar. 28, 1916 |
| 1,855,172 | Hess | Apr. 19, 1932 |
| 2,443,847 | Williamson | June 22, 1948 |